(12) United States Patent
Potter et al.

(10) Patent No.: US 10,294,805 B2
(45) Date of Patent: May 21, 2019

(54) GAS TURBINE ENGINE INTEGRALLY BLADED ROTOR WITH ASYMMETRICAL TRENCH FILLETS

(71) Applicant: UNITED TECHNOLOGIES CORPORATION, Farmington, CT (US)

(72) Inventors: Christopher L. Potter, East Hampton, CT (US); David A. Knaul, Glastonbury, CT (US); Michael Espinoza, Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 441 days.

(21) Appl. No.: 15/104,251

(22) PCT Filed: Dec. 10, 2014

(86) PCT No.: PCT/US2014/069573
§ 371 (c)(1),
(2) Date: Jun. 14, 2016

(87) PCT Pub. No.: WO2015/130381
PCT Pub. Date: Sep. 3, 2015

(65) Prior Publication Data
US 2016/0319835 A1    Nov. 3, 2016

Related U.S. Application Data

(60) Provisional application No. 61/919,063, filed on Dec. 20, 2013.

(51) Int. Cl.
*F01D 5/02* (2006.01)
*F01D 5/14* (2006.01)
(Continued)

(52) U.S. Cl.
CPC ................. *F01D 5/34* (2013.01); *F01D 5/02* (2013.01); *F01D 5/143* (2013.01); *F04D 29/321* (2013.01);
(Continued)

(58) Field of Classification Search
CPC . F01D 5/02; F01D 5/143; F01D 5/145; F01D 5/34; F04D 29/18; F04D 29/26;
(Continued)

(56) References Cited

U.S. PATENT DOCUMENTS 4,422,827 A * 12/1983 Buxe ..................... F01D 11/006
415/173.7
5,213,475 A    5/1993 Peterson et al.
(Continued)

FOREIGN PATENT DOCUMENTS

EP    0846867    6/1998
EP    1199439    4/2002
(Continued)

OTHER PUBLICATIONS

International Search Report and Written Opinion for PCT Application No. PCT/US2014/069573, dated Aug. 27, 2015.
(Continued)

*Primary Examiner* — Igor Kershteyn
*Assistant Examiner* — Topaz L. Elliott
(74) *Attorney, Agent, or Firm* — Carlson, Gaskey & Olds, P.C.

(57) ABSTRACT

An integrally bladed rotor includes a rotor that has a rim that provides an inner flow surface. Circumferentially spaced apart radially extending airfoils integrally with and from the rotor and joined by an airfoil fillet. An asymmetrical trench is provided in the rim between adjacent airfoils.

14 Claims, 4 Drawing Sheets

(51) Int. Cl.
*F01D 5/34* (2006.01)
*F04D 29/32* (2006.01)

(52) U.S. Cl.
CPC ...... *F05D 2220/32* (2013.01); *F05D 2240/24* (2013.01); *Y02T 50/671* (2013.01); *Y02T 50/673* (2013.01)

(58) Field of Classification Search
CPC .. F04D 29/321; F04D 29/329; F05D 2260/94; F05D 2260/241
See application file for complete search history.

(56) References Cited

U.S. PATENT DOCUMENTS

| | | | | |
|---|---|---|---|---|
| 6,017,186 | A * | 1/2000 | Hoeger | F01D 5/143 415/181 |
| 6,213,711 | B1 | 4/2001 | Muller et al. | |
| 6,471,474 | B1 * | 10/2002 | Mielke | F01D 5/02 29/889.21 |
| 6,478,539 | B1 * | 11/2002 | Trutschel | F01D 5/143 415/223 |
| 6,478,545 | B2 * | 11/2002 | Crall | B23K 20/129 416/213 R |
| 6,524,070 | B1 * | 2/2003 | Carter | F01D 5/141 416/193 A |
| 7,445,433 | B2 | 11/2008 | Chivers et al. | |
| 8,100,655 | B2 * | 1/2012 | Stone | B23C 3/18 29/889.2 |
| 8,403,645 | B2 * | 3/2013 | Barnes | F01D 5/143 416/234 |
| 8,439,643 | B2 | 5/2013 | Kuhne et al. | |
| 8,459,956 | B2 * | 6/2013 | Pandey | F01D 5/143 416/190 |
| 8,647,067 | B2 * | 2/2014 | Pandey | F01D 5/143 416/193 A |
| 2002/0127108 | A1 | 9/2002 | Crall et al. | |
| 2006/0275126 | A1 | 12/2006 | Heitland et al. | |
| 2010/0143139 | A1 * | 6/2010 | Pandey | F01D 5/143 416/179 |
| 2011/0064580 | A1 * | 3/2011 | Barnes | F01D 5/143 416/204 A |
| 2013/0164137 | A1 | 6/2013 | Barnes et al. | |
| 2013/0251520 | A1 * | 9/2013 | Barr | F01D 5/143 415/208.2 |

FOREIGN PATENT DOCUMENTS

| | | |
|---|---|---|
| EP | 1239116 | 9/2002 |
| JP | 08338201 A | 12/1996 |

OTHER PUBLICATIONS

Extended European Search Report for European Application No. 14883559.8 dated Dec. 12, 2016.

International Preliminary Report on Patentability for PCT Application No. PCT/US2014/069573, dated Jun. 30, 2016.

* cited by examiner

GAS TURBINE ENGINE INTEGRALLY BLADED ROTOR WITH ASYMMETRICAL TRENCH FILLETS

CROSS-REFERENCE TO RELATED APPLICATIONS

This application claims priority to U.S. Provisional Application No. 61/919,063, which was filed on Dec. 20, 2013 and is incorporated herein by reference.

BACKGROUND

This disclosure relates to a gas turbine engine having an integrally bladed rotor.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The fan, turbine and compressor sections of gas turbine engines include one or more circumferentially extending rows or stages of rotatable blades. The rotor blades are connected to and extend radially outwardly from a rotor. During operation the centrifugal loads of the rotor blades must be carried by the rotor within acceptable stress limits.

Conventional rotor blades are carried in the rotor disk by a dovetail or fir tree root which slides into and interlocks with a corresponding dovetail slot in the perimeter of the rotor. However, as the number of blades around the perimeter of the disk increases, there may be insufficient material available for supporting the blades within acceptable stress limits. Accordingly, integrally bladed disks have been developed and are commercially used. Integrally bladed disks do not utilize the interlocked dovetail design but instead are integrally joined to the rotor blades as a single-piece, unitary assembly by milling, forging, casting or other known manufacturing operations. Integrally bladed rotors, or IBRs, can be used to increase aerodynamic efficiency of gas turbine engine while reducing the stresses associated with supporting the blades.

One of the stresses associated with supporting the blades is a hoop stress. The hoop stress is defined as a load measured in the direction of the circumference of a rotating body, the load being created by thermal gradients and centrifugal forces acting in a radial direction. The hoop stress is particularly acute where the gas turbine engine utilizes integrally bladed rotors. Integrally bladed rotors have been known to develop fractures along their perimeter during operation due to the hoop stress and principal stresses. These fractures necessitate replacement of the integrally bladed rotors to avoid a catastrophic failure.

One or more trenches have been used circumferentially between adjacent blades to reduce the hoop stresses. These trenches have been symmetrical in shape.

SUMMARY

In one exemplary embodiment, an integrally bladed rotor includes a rotor that has a rim that provides an inner flow surface. Circumferentially spaced apart radially extending airfoils integrally with and from the rotor and joined by an airfoil fillet. An asymmetrical trench is provided in the rim between adjacent airfoils.

In a further embodiment of the above, the trench is provided near a trailing edge of the airfoil.

In a further embodiment of any of the above, the trailing edge trench includes pressure and suction side fillets. The pressure side fillet is smaller than the suction side fillet.

In a further embodiment of any of the above, the ratio of the suction side fillet relative to the pressure side fillet is in the range 2:1 to 20:1.

In a further embodiment of any of the above, the ratio of the suction side fillet relative to the pressure side fillet is about 10:1.

In a further embodiment of any of the above, the trailing edge trench extends to the airfoil fillet of the adjacent blades.

In a further embodiment of any of the above, the airfoil fillet is in the range of 0.040-0.250 inch (1.01-6.35 mm).

In a further embodiment of any of the above, the trailing edge fillet extends to an edge of an aft portion of the rim.

In a further embodiment of any of the above, the aft portion includes a lip configured to overlap with an adjacent rim.

In a further embodiment of any of the above, the edge is arranged at the airfoil fillet.

In a further embodiment of any of the above, trailing edge trench extends 18% of the airfoil chord.

In a further embodiment of any of the above, a leading edge fillet is spaced from the trailing edge fillet.

In a further embodiment of any of the above, the leading and trailing edges are combined to provide one continuous trench.

In a further embodiment of any of the above, the leading edge trench includes symmetrical fillets.

In another exemplary embodiment, an integrally bladed rotor includes a rotor that has a rim that provides an inner flow surface. Circumferentially spaced apart radially extending airfoils integrally with and from the rotor and joined by an airfoil fillet. An asymmetrical trailing edge trench is provided in the rim between adjacent airfoils near trailing edges of the airfoils. The trailing edge trench extends to the airfoil fillet of the adjacent blades.

In a further embodiment of the above, the trailing edge trench includes pressure and suction side fillets. The pressure side fillet is smaller than the suctions side fillet. The ratio of the suction side fillet relative to the pressure side fillet is in the range 2:1 to 20:1.

In a further embodiment of any of the above, the ratio of the integrally bladed rotor is about 10:1.

In a further embodiment of any of the above, the trailing edge fillet extends to an edge of an aft portion of the rim. The aft portion includes a lip configured to overlap with an adjacent rim. The edge is arranged at the airfoil fillet.

In a further embodiment of any of the above, a trailing edge trench extends 100% of the airfoil chord.

In a further embodiment of any of the above, the trailing trench is within the last 18% chord.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
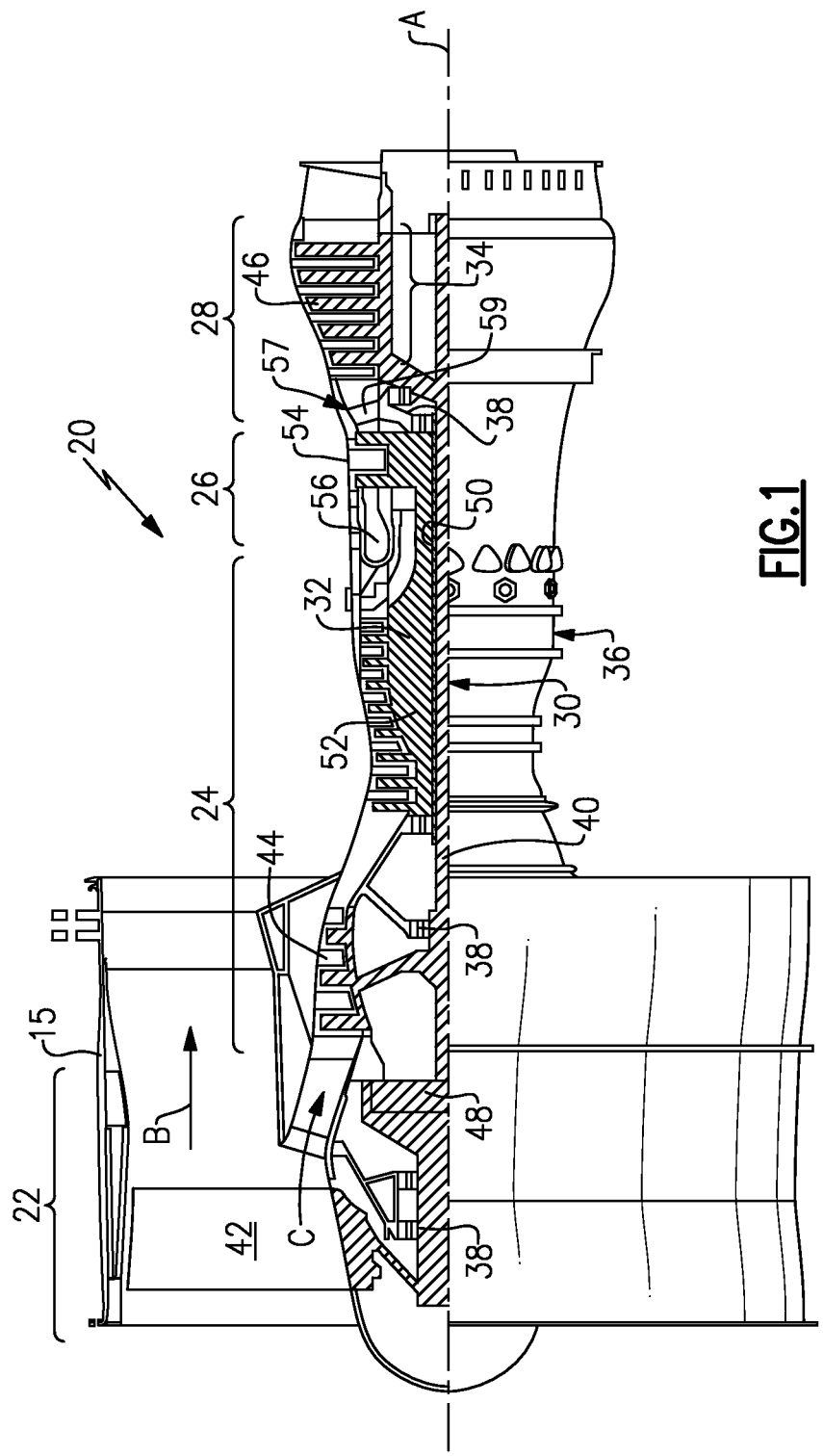
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15 while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° R)/(518.7° R)]^{0.5}$. The "Low corrected fan tip speed" as disclosed herein according to one non-limiting embodiment is less than about 1150 ft/second.

Figure 2:
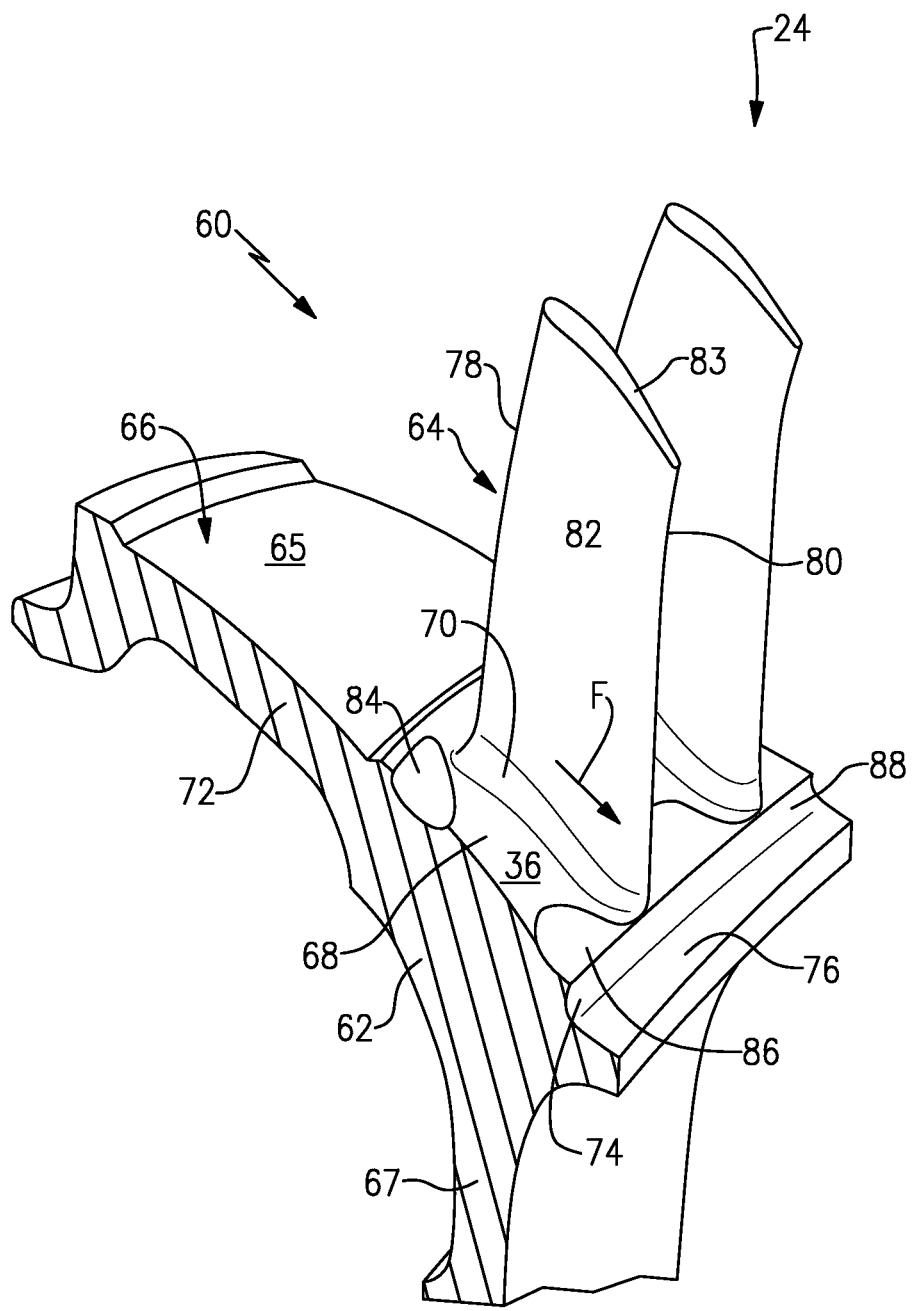
FIG. 2 is a perspective view of a circumferential section of an example integrally bladed rotor.

An example integrally bladed rotor (IBR) 60 is shown in FIG. 2. The IBR 60 is typically used in a compressor section 24, for example, in the low pressure compressor 44. The IBR 60 includes a rotor 62 that includes integrally formed radially extending circumferentially spaced airfoils 64 provided blades. An example, the rotor 62 includes an axially extending annular rim 66 joined to a radially inwardly extending web 67. The rim 66 provides an inner flow surface 68 from which the airfoils 64 extend.

In the example illustrated, of the rim 66 includes a forward portion 72 having a recessed area 65, which may support a seal structure, such as a rub coating system, that is arranged adjacent to an inner diameter of an array of stator vanes (not shown). An aft portion 74 includes a lip 76 that is configured to cooperate with another rotor in an overlapping relationship. The rim geometry may be any suitable configuration for a particular section.

The airfoil 64 includes suction and pressure sides 82, 83 joined at leading and trailing edges 78, 80. A fillet 70 joins a perimeter of the airfoil 64 to the inner flow surface 68. An example fillet 70 is in the range of 0.040-0.250 inch (1.01-6.35 cm). The fillet 70 aerodynamically transitions from the base of the airfoil 64 to the inner flow path surface 68 and is sized to provide sufficient strength at the interface between the airfoil 64 and rim 66. The fillet 70 may be truncated.

The IBR 60 experiences thermal mechanical fatigue (TMF) about the fillet 70 during acceleration and deceleration of the IBR. Trenches or depressions have been proposed for the inner flow path surface 68 between adjacent airfoils 64 as a means of decreasing concentrated hoop stresses in the rim 66 within this area and increase overall life. The prior art trenches may not provide a significant enough reduction in stresses while maintaining a sufficiently low mass for the IBR. Moreover, symmetrical trenches tend to generate asymmetrical hoop stresses between the suction and pressure side 82, 83 of adjacent blades. Asymmetrical trenches may be used to better balance the stresses between adjacent airfoils.

Figure 3:
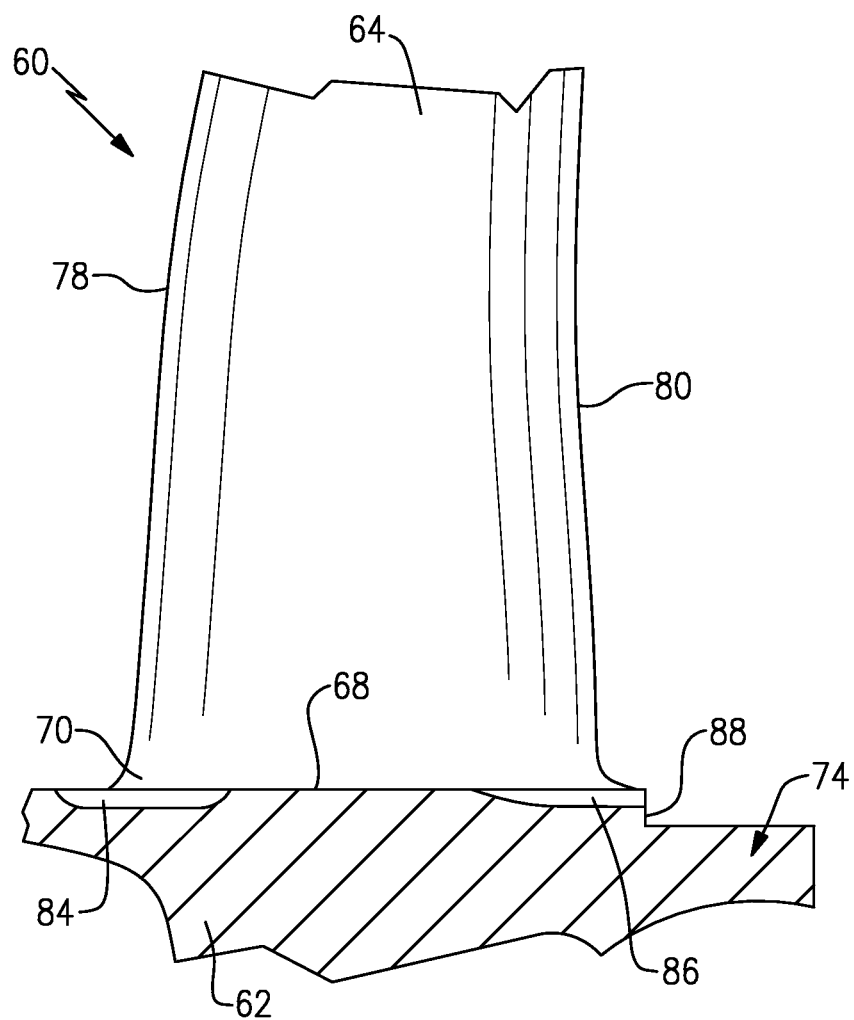
FIG. 3 is an enlarged cross-sectional view of the circumferential section shown in FIG. 2.
Figure 4:
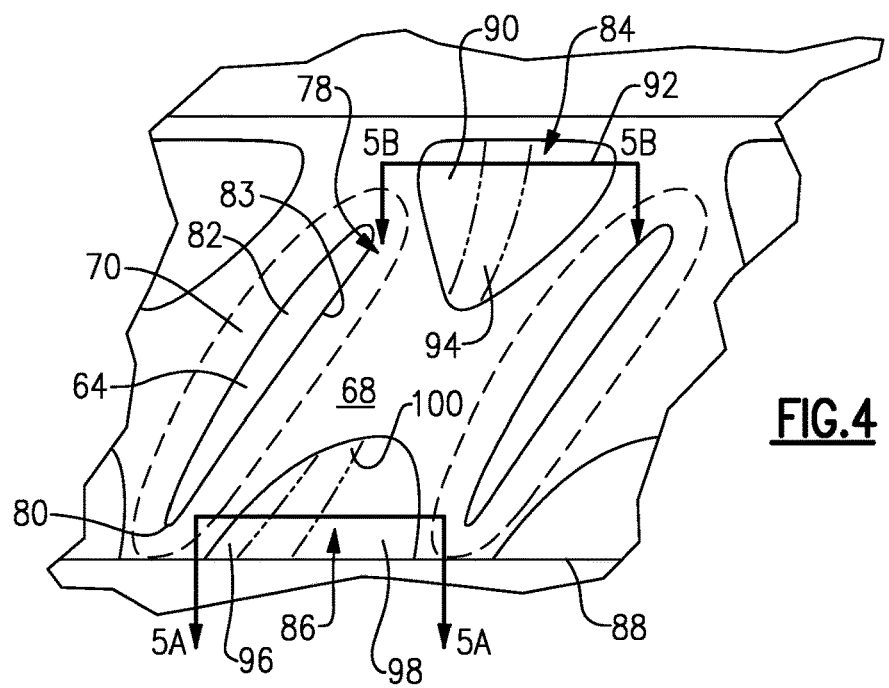
FIG. 4 is a top elevational view of the integrally bladed rotor shown in FIG. 2.

Leading and trailing edge trenches 84, 86 are provided in the inner flow path surface 68 near the leading and trailing edges 78, 80. Referring to FIGS. 2-4, the leading edge trench 84 overlaps the fillet 70 at the leading edge 78. The trailing edge trench 86 extends to an edge 88 provided at the lip 76. The fillet 70 at the trailing edge 80 ends at the edge 88 in the example, as best shown in FIG. 3. In one example, the radial depth of the leading and trailing edge trenches 84, 86 is between 0.005 inch (0.127 mm) and 0.060 inch (1.52 mm).

Figure 5A:
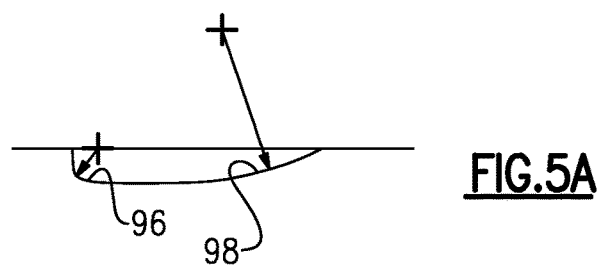
FIG. 5A is a cross-sectional view through the rotor of FIG. 4 taken along line 5A-5A.
Figure 5B:
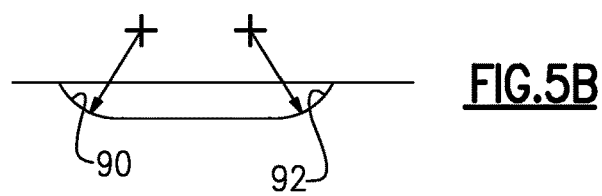
FIG. 5B is a cross-sectional view through the rotor of FIG. 4 taken along line 5B-5B.

The leading edge trench 84 includes pressure and suction side fillets 90, 92, as shown in FIG. 5B. An axial fillet 94 blends the pressure and suction side fillets 90, 92 into the inner flow surface 68. In one example, the leading edge pressure and suction side fillet 90, 92 are in the range of 0.1-1.0 inches (2.54-25.4 mm). For example, the leading edge pressure and suction side fillet 90, 92 are 0.75 inch (19.05 mm).

The trailing edge trench 86 includes trailing edge pressure and suction side fillets 96, 98, as shown in FIG. 5A. In one example, the trailing trench extends 18% of the airfoil's chord, and, for example, the last 18% of the chord. An axial fillet 100 blends the pressure and suction side fillets 96, 98 into the inner flow surface 68. The suction side fillet 98 includes a larger radius than the pressure side fillet 96, for example, in the range of 2:1 to 20:1. In one example, the pressure side fillet is 0.1 inch (2.54 mm), and the suction side fillet 98 is 1.0 inch (25.4 mm), a 10:1 ratio. The leading edge and trailing edge trenches could be combined to make one continuous trench.

The use of an asymmetrical trench in the trailing edge portion of the rim 66 enables a concentrated hoop stress reduction of about 5% to 15% as compared to IBR's having a symmetrical trench in this area. With asymmetrical trenches, a deeper trench may be used which is desirable because concentrated hoop stresses in the trench and airfoil fillet can be better balanced. An asymmetrical trench may also be used at the leading edge, however, hoop stresses tend to be more imbalanced at the trailing edge.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An integrally bladed rotor comprising:
   a rotor having a rim that provides an inner flow surface;
   circumferentially spaced apart radially extending airfoils integral with the rotor and extending therefrom, joined by an airfoil fillet; and
   an asymmetrical trench provided in the rim between adjacent airfoils, wherein the asymmetrical trench is provided near a trailing edge of one of the adjacent airfoils, wherein the asymmetrical trench includes pressure and suction side fillets, the pressure side fillet smaller than the suction side fillet.

2. The integrally bladed rotor according to claim 1, wherein a ratio of the suction side fillet radius relative to the pressure side fillet radius is in the range of 2:1 to 20:1.

3. The integrally bladed rotor according to claim 2, wherein the ratio is 10:1.

4. The integrally bladed rotor according to claim 1, wherein the asymmetrical trench extends to the airfoil fillet of the adjacent airfoils.

5. The integrally bladed rotor according to claim 4, wherein the airfoil fillet has a radius in the range of 0.040-0.250 inch (1.01-6.35 mm).

6. The integrally bladed rotor according to claim 1, wherein the asymmetrical trench extends to an edge of an aft portion of the rim.

7. The integrally bladed rotor according to claim 6, wherein the aft portion of the rim includes a lip configured to overlap with a rim of an adjacent rotor.

8. The integrally bladed rotor according to claim 7, wherein the edge of the aft portion of the rim is arranged at the airfoil fillet.

9. The integrally bladed rotor according to claim 1, wherein the asymmetrical trench extends 18% of a chord length of an adjacent airfoil.

10. An integrally bladed rotor assembly comprising:
    a first integrally bladed rotor having a first rim that provides an inner flow surface;
    circumferentially spaced apart radially extending airfoils integral with the rotor and extending therefrom, joined by an airfoil fillet; and
    an asymmetrical trailing edge trench provided in the first rim between adjacent airfoils near trailing edges of the airfoils, one of the adjacent airfoils having a chord length, the trailing edge trench extends to the airfoil fillet of the adjacent airfoils, wherein the asymmetrical trench extends to an edge of an aft portion of the first rim, the aft portion includes a lip configured to overlap with a second rim of an adjacent second integrally bladed rotor, and the edge of the aft portion of the second rim is arranged at the airfoil fillet.

11. The integrally bladed rotor assembly according to claim 10, wherein trailing edge trench extends 100% of the airfoil chord length.

12. The integrally bladed rotor assembly according to claim 10, wherein the trailing edge trench is within the last 18% of the airfoil chord length.

13. An integrally bladed rotor comprising:
   a rotor having a rim that provides an inner flow surface;
   circumferentially spaced apart radially extending airfoils integral with the rotor and extending therefrom, joined by an airfoil fillet; and
   an asymmetrical trailing edge trench provided in the rim between adjacent airfoils near trailing edges of the airfoils, one of the adjacent airfoils having a chord length, the trailing edge trench extends to the airfoil fillet of the adjacent airfoils, wherein the trailing edge trench includes pressure and suction side fillets, the pressure side fillet smaller than the suction side fillet, and a ratio of the suction side fillet radius relative to the pressure side fillet radius is in the range of 2:1 to 20:1.

14. The integrally bladed rotor according to claim 13, wherein the ratio is 10:1.

\* \* \* \* \*